(12) United States Patent  (10) Patent No.: US 8,522,043 B2
Duffus et al.  (45) Date of Patent: Aug. 27, 2013

(54) HARDWARE-BASED COMPUTER THEFT DETERRENCE

(75) Inventors: James S. Duffus, Seattle, WA (US); Curt Andrew Steeb, Redmond, WA (US); Thomas G. Phillips, Bellevue, WA (US); Jeffrey Alan Herold, Bellevue, WA (US); William Poole, Bellevue, WA (US); William J. Westerinen, Issaquah, WA (US); Martin H. Hall, Sammamish, WA (US)

(73) Assignee: Microsoft Corporation, Redmond, WA (US)

( * ) Notice: Subject to any disclaimer, the term of this patent is extended or adjusted under 35 U.S.C. 154(b) by 1395 days.

(21) Appl. No.: 11/766,602

(22) Filed: Jun. 21, 2007

(65) Prior Publication Data

US 2008/0320312 A1   Dec. 25, 2008

(51) Int. Cl.
*G06F 11/30* (2006.01)

(52) U.S. Cl.
USPC .......... 713/189; 713/155; 713/170; 713/169; 713/179; 726/12; 726/2; 709/229; 705/51; 380/30

(58) Field of Classification Search
USPC ..................... 726/34–35; 713/189
See application file for complete search history.

(56) References Cited

U.S. PATENT DOCUMENTS

| | | | |
|---|---|---|---|
| 5,325,430 A | 6/1994 | Smyth et al. | |
| 5,483,649 A | 1/1996 | Kuznetsov et al. | |
| 5,896,497 A * | 4/1999 | Halstead | 726/35 |
| 6,141,757 A * | 10/2000 | Seeker et al. | 726/22 |
| 7,107,349 B2 * | 9/2006 | Britt, Jr. | 709/229 |
| 7,111,324 B2 * | 9/2006 | Elteto et al. | 726/9 |
| 7,194,443 B1 * | 3/2007 | Post et al. | 705/405 |
| 7,215,771 B1 * | 5/2007 | Hamlin | 380/44 |
| 7,313,825 B2 * | 12/2007 | Redlich et al. | 726/27 |
| 7,360,253 B2 * | 4/2008 | Frank et al. | 726/34 |
| 7,389,425 B2 * | 6/2008 | Hasbun et al. | 713/186 |
| 7,695,335 B2 * | 4/2010 | Ricciuti et al. | 441/89 |
| 7,805,756 B2 * | 9/2010 | Ellis | 726/11 |
| 7,942,936 B2 * | 5/2011 | Golden | 726/35 |
| 2002/0059528 A1 * | 5/2002 | Dapp | 713/201 |
| 2003/0037172 A1 * | 2/2003 | Lacombe et al. | 709/310 |
| 2003/0174844 A1 * | 9/2003 | Candelore | 380/277 |
| 2003/0221141 A1 * | 11/2003 | Wenisch | 714/47 |
| 2004/0083375 A1 * | 4/2004 | Foster et al. | 713/189 |
| 2004/0225894 A1 * | 11/2004 | Colvin | 713/200 |

(Continued)

OTHER PUBLICATIONS

Kariniemi Heikki, Fault Tolerant communication, Oct. 2009, IEEE, vol. 12, pp. 5-12.*

(Continued)

*Primary Examiner* — Nathan Flynn
*Assistant Examiner* — Viral Lakhia
(74) *Attorney, Agent, or Firm* — The Law Office of Michael E. Kondoudis

(57) ABSTRACT

A hardware-based security module is used to protect an electronic device, especially a portable electronic device. The security module may determine either via timeout of a watchdog timer or via an explicit message to encrypt selected data on the electronic device. In addition, the electronic device may enter a limited function mode that only allows display of simplistic messages and supports network traffic with a recovery service. The recovery service may be able to use the network traffic to locate the electronic device. The security module may include a secure memory, a cryptographic function, a timer, and support for direct display of data on a monitor.

20 Claims, 4 Drawing Sheets

(56) References Cited

U.S. PATENT DOCUMENTS

| | | |
|---|---|---|
| 2005/0046580 A1* | 3/2005 | Miranda-Knapp et al. .......................... 340/686.1 |
| 2005/0182944 A1 | 8/2005 | Wagner et al. |
| 2005/0273626 A1* | 12/2005 | Pearson et al. ................. 713/186 |
| 2006/0021059 A1* | 1/2006 | Brown et al. ................... 726/26 |
| 2006/0036879 A1* | 2/2006 | Wahler et al. ................. 713/300 |
| 2007/0136570 A1 | 6/2007 | Frank et al. |
| 2007/0174621 A1* | 7/2007 | Ducharme ................... 713/176 |
| 2008/0178304 A1* | 7/2008 | Jeansonne et al. .............. 726/34 |
| 2008/0238614 A1* | 10/2008 | Delia et al. ................... 340/5.85 |
| 2009/0183245 A1* | 7/2009 | Simpson et al. .................. 726/7 |

OTHER PUBLICATIONS

Written Opinion for PCT/US2008/067514 mailed Nov. 27, 2008.
International Search Report for PCT/US2008/067514 mailed Nov. 27, 2008.

* cited by examiner

HARDWARE-BASED COMPUTER THEFT DETERRENCE

BACKGROUND

The feature that makes portable electronics attractive is also the feature that makes them vulnerable to loss and theft. That is, their size and ease of transport. Laptop computers, cellular telephones, convergence devices, such as the Blackberry™, and other portable electronic devices are inherently small and easily moved. If left out or misplaced, such devices are easily hidden and removed by even a casual passer-by.

The consequences of an electronic device falling into the wrong hands are routinely seen in the headlines. From U.S. military personnel to Chicago public school teachers, millions of people's personal information may be been comprised by stolen laptop computers. Celebrity cell phone address books are fodder for grocery line scandal sheets. Stolen industrial secrets can be worth millions of dollars in high tech espionage wars.

Many attempts to protect portable electronic devices have been attempted. Several involve motion detection and attempt to distinguish between walking and running, with consideration for travel on an airplane. Motion detection can, at best, offer limited effectiveness in either preventing theft or aiding in recovery of missing device. Other methods place a small software-based module in firmware that systematically erases memory when signaled that the electronic device is lost or stolen. Such software-based measures rely on remaining out of view and hidden so that they can operate before being discovered and removed. Because they must remain hidden and operate undercover, software-based security or recovery measures offer no opportunity to deter a potential thief from viewing the electronic device as anything but a target of opportunity.

SUMMARY

A secure by design hardware-based theft monitor may be used to support not only limiting the effect of loss and aiding in recovery of an electronic device, but may also offer a deterrence to theft. By openly advertising that the electronic device is protected, would-be thieves may reconsider taking such a device. Just as a home with a burglar alarm may make the home less of a target for a break in, an electronic device marked as being protected by a hardware theft system may encourage a thief to move on to a more opportunistic target.

The hardware-based theft monitor includes a security module that may use a watchdog timer, a cryptographic capability and a secure memory. The security module may also include a mechanism to cause booting in either a normal operating mode or a limited function mode. The limited function mode may be triggered by one of several events that would indicate the electronic device has fallen into the wrong hands. In the limited function mode, the electronic device may actively protect assets by ensuring that sensitive information is encrypted. Additionally, when in the limited function mode, operation of the electronic device may be restricted to a very limited set of routines that may include support for recovery efforts, such as sending a homing message, and for restoring normal operation when the electronic device is back in the control of authorized users. In one embodiment, the electronic device in the limited function mode may display a message that indicates where to return the electronic device, if found.

The electronic device may operate as part of a system that maintains operation when using the watchdog timer mode as well as for sending a message to the electronic device to encrypt data and enter the limited function mode after being reported lost. The system may also support recovery efforts by monitoring information sent from a wayward device, if available, indicating IP address information or other data that can be used to locate the electronic device.

DETAILED DESCRIPTION

Although the following text sets forth a detailed description of numerous different embodiments, it should be understood that the legal scope of the description is defined by the words of the claims set forth at the end of this disclosure. The detailed description is to be construed as exemplary only and does not describe every possible embodiment since describing every possible embodiment would be impractical, if not impossible. Numerous alternative embodiments could be implemented, using either current technology or technology developed after the filing date of this patent, which would still fall within the scope of the claims.

It should also be understood that, unless a term is expressly defined in this patent using the sentence "As used herein, the term '_____' is hereby defined to mean . . . " or a similar sentence, there is no intent to limit the meaning of that term, either expressly or by implication, beyond its plain or ordinary meaning, and such term should not be interpreted to be limited in scope based on any statement made in any section of this patent (other than the language of the claims). To the extent that any term recited in the claims at the end of this patent is referred to in this patent in a manner consistent with a single meaning, that is done for sake of clarity only so as to not confuse the reader, and it is not intended that such claim term by limited, by implication or otherwise, to that single meaning. Finally, unless a claim element is defined by reciting the word "means" and a function without the recital of any structure, it is not intended that the scope of any claim element be interpreted based on the application of 35 U.S.C. §112, sixth paragraph.

Much of the inventive functionality and many of the inventive principles are best implemented with or in software programs or instructions and integrated circuits (ICs) such as application specific ICs. It is expected that one of ordinary skill, notwithstanding possibly significant effort and many design choices motivated by, for example, available time, current technology, and economic considerations, when guided by the concepts and principles disclosed herein will be readily capable of generating such software instructions and programs and ICs with minimal experimentation. Therefore, in the interest of brevity and minimization of any risk of obscuring the principles and concepts in accordance to the present invention, further discussion of such software and ICs, if any, will be limited to the essentials with respect to the principles and concepts of the preferred embodiments.

Figure 1:
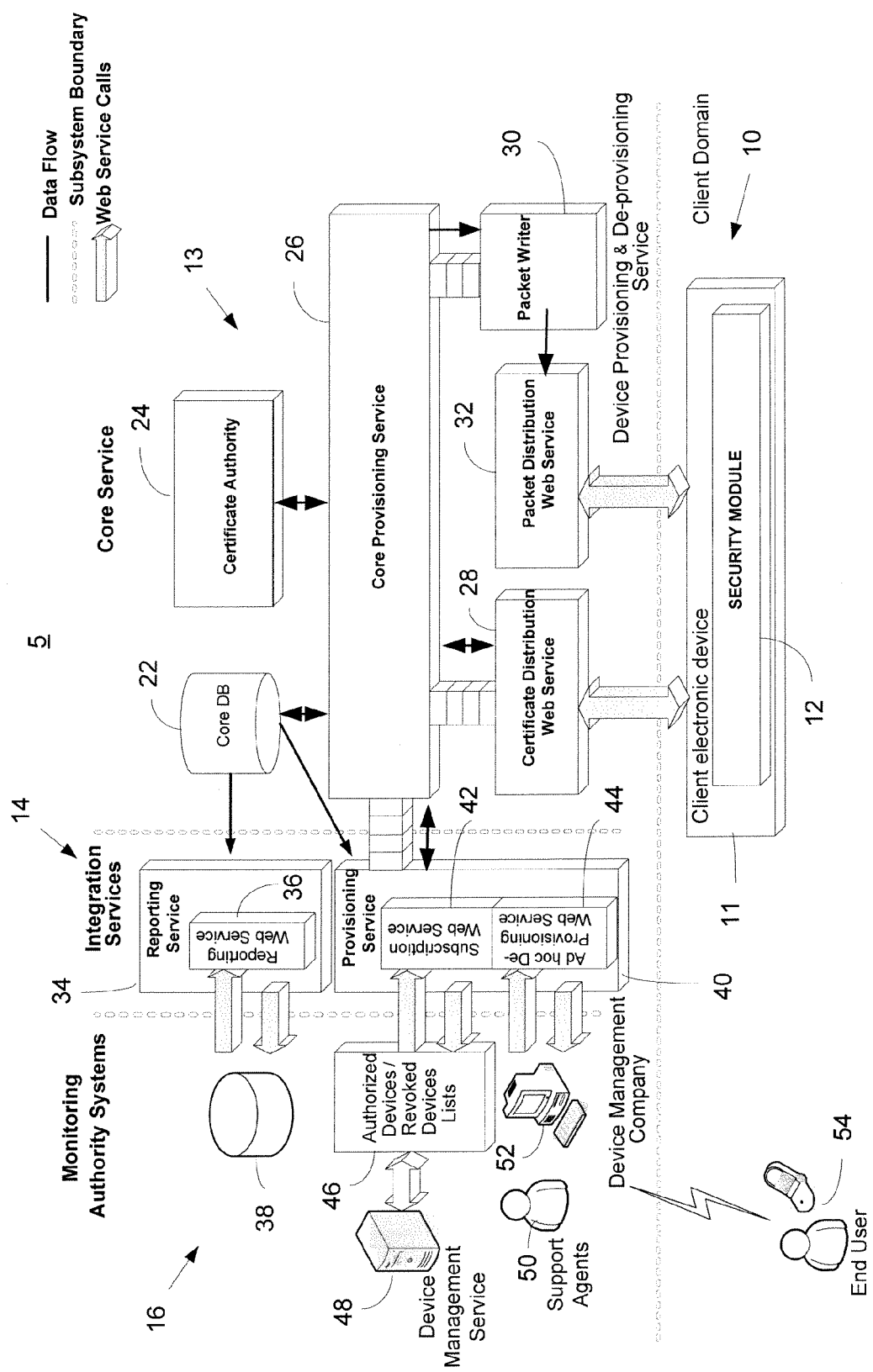
FIG. 1 is a system diagram showing elements of a hardware-based theft deterrent.

FIG. 1 is a block diagram of a system 5 that supports protection of electronic device assets. The asset may include the electronic device itself, data stored on the electronic device, or both. In a client domain 10, an electronic device 11 may include a security module 12. The electronic device 11 may be a laptop computer, a cellular telephone, a personal digital assistant (PDA), etc. While the use of a hardware-based theft deterrence may most obviously be targeted at portable electronics, it is equally applicable to less portable equipment, such as servers, where the risk associated with loss may be significantly higher. The client electronic device 11 and security module 12 are discussed in more detail with respect to FIG. 2.

A core service domain 13 may be used to interface between devices in the client domain 10 and other systems and service providers. The core service domain may include a core database 22 that stores information about each electronic device 11 in the client domain 10. The information may include owner information, user information, hardware and software configuration information, and contract type. The contract type may include whether a particular electronic device 11 is owned outright, leased, or uses a pay-per-use model.

A certificate authority 24 operates in a conventional manner for certificate authorities by generating and maintaining digital certificates that incorporate public and private key pairs used for privacy and authentication. A core provisioning service 26 may be used to manage interactions with electronic devices, such as electronic device 11, in the client domain 10. A certificate distribution web service 28 works in conjunction with the certificate authority 24 to provide and maintain valid certificates on client domain devices. A packet writer 30 may take provisioning data from the provisioning service 26 and format it into a uniquely addressed provisioning packet. A packet distribution service 32 may use a web services protocol to ensure delivery of the provisioning packet to its respective recipient in the client domain 10. The provisioning packet may be signed and encrypted for consumption only in a protected environment provided by the security module 12 of the recipient electronic device 11. The provisioning packet may include activation or deactivation messages, watchdog timer reset messages, pay-per-use usage credit, etc.

An integration services domain 14 may include a reporting service 34 that includes Web services support for reporting 36, and a provisioning service 40 that may include Web services modules 42 and 44 supporting subscription provisioning and ad hoc de-provisioning respectively.

Monitoring authority systems 16 may include a database 38, revocation lists 46, a device management service 48, and a device management caller taker 50 and a public answering point 52. An end user, system operator, or other person 54 may contact the public answering point 52 to report a lost or stolen electronic device 11, such as one found by another person.

In operation, when the electronic device 11 boots, it determines whether it should operate in a normal or limited mode, for example, by checking a flag in the security module 12. When in the normal mode, booting continues normally and following a successful login, the user is allowed to operate within the context of the licensing of the electronic device 11 and its software.

The electronic device 11 may determines, such as by a flag in secure memory, or a succession of invalid login attempts, that the electronic device 11 should boot in a limited function mode. In this mode, only limited user interface and network traffic functions may operate. For example, the security module may restrict graphics processing to display only the message, "This device is locked, to unlock contact 555-1000 or www.returnme.org." At the same time, network traffic may be restricted to sending packets to a known home URL, with the goal that routing information in the packets may lead to the physical location of the electronic device 1 and possible recovery. In other embodiments, a normal, although possible extended, boot may be presented to the user, but during the process critical files may be encrypted and recovery packets sent. The appearance of a successful login may be presented or an actual login given to an account very limited rights. Alternatively, a system error 'blue screen' may be presented to give the appearance that an error has occurred, frustrating a potentially malicious user from accessing the system, while still broadcasting recovery packets. After recovery, a sequence of keystrokes or presentation of a token may be used to restore normal operation.

When loss or misuse occurs and no local triggering event occurs, for example, if a previously logged in computer is stolen, a different sequence of events may occur. A person 54 may contact the public answering point 52 and processing of a lost/stolen report may be may via an operator 50, or automatically if the public answering point 52 is so equipped. The report may be entered and checked for subscription status as the provisioning service 40. If the electronic device 11 subscription is valid, the report may be checked against previous reports at the reporting service 34 and in the database 38. If no previous action has been taken, action may be requested at the ad-hoc de-provisioning service 44. As shown, the various services are web-services, allowing easy maintenance and decentralization, but a web-service model is not required.

The ad-hoc de-provisioning service may send a message to the core service 13 for the core provisioning service 26 to prepare a message for the electronic device 11 to de-activate itself. The message may be signed and sent to the packet writer 30 and forwarded to the packet distribution service 32 for download to the electronic device 11. The download may occur whenever a connection is available capable of supporting communication between the electronic device 11 and the packet distribution service 32. The packet distribution service 32 and its supporting infrastructure of the core service 13 may also be used to distribute a variety of packets that may be used by the electronic device 11, especially when the electronic device 11 operates in a pay-per-use mode. The pay-per-use oriented packets may include time packets for clock synchronization, usage or subscription packets for continued metered operation, etc.

When the deactivate message is received and verified at the electronic device 11, the device may enter the limited function mode. The actual entry method may reflect those described above with respect to booting in the limited function mode, that is, the electronic device 11 may simulate a crash while ensuring that data on the electronic device 11 is encrypted. The data for encryption may be normally encrypted, that is, only decrypted for use, or may be normally decrypted and only encrypted when indicated. The data for encryption may be in one or more designated folders, may be selectively designated, or may be any non-system file. Alternatively, the electronic device 11 may be allowed to operate normally while data is encrypted and recovery packets are sent. Only after encryption is complete, a recovery response is received, or both, may the electronic device 11 be reset. A limited use flag in security module 12 may also be set prior to a reset. When the flag is set, subsequent re-booting may occur as described above.

Figure 2:
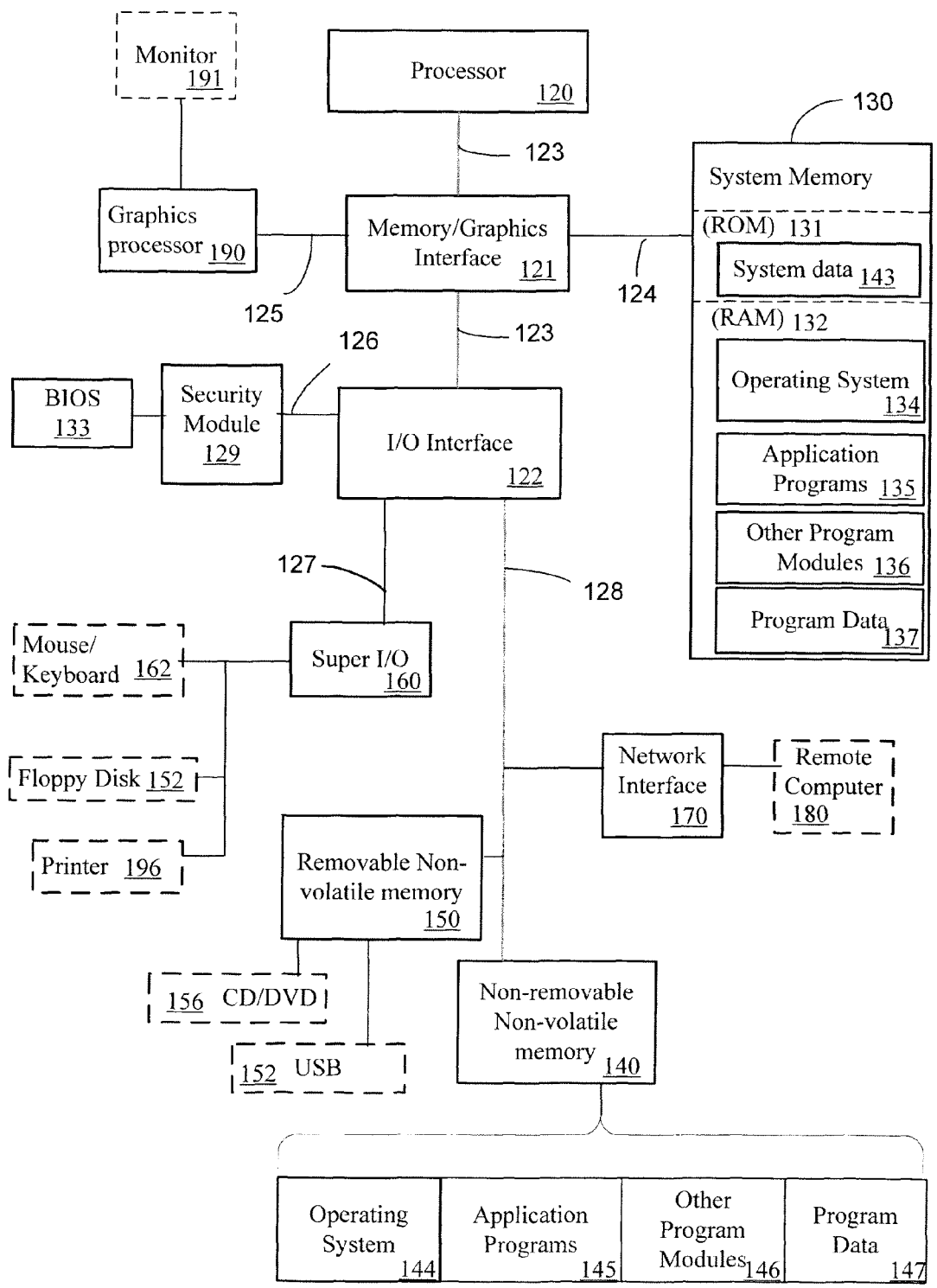
FIG. 2 is a block diagram of showing an electronic device in the form of a computer supporting hardware theft deterrence.

With reference to FIG. 2, an exemplary electronic device for implementing the claimed method and apparatus may include a general purpose computing device in the form of a computer 110. Components shown in dashed outline are not technically part of the computer 110, but are used to illustrate the exemplary embodiment of FIG. 2. Components of computer 110 may include, but are not limited to, a processor 120, a system memory 130, a memory/graphics interface 121, also known as a Northbridge chip, and an I/O interface 122, also known as a Southbridge chip. The system memory 130 and a graphics processor 190 may be coupled to the memory/graphics interface 121. A monitor 191 or other graphic output device may be coupled to the graphics processor 190.

A series of system busses may couple various system components including a high speed system bus 123 between the processor 120, the memory/graphics interface 121 and the I/O interface 122, a front-side bus 124 between the memory/graphics interface 121 and the system memory 130, and an advanced graphics processing (AGP) bus 125 between the memory/graphics interface 121 and the graphics processor 190. The system bus 123 may be any of several types of bus structures including, by way of example, and not limitation, such architectures include Industry Standard Architecture (ISA) bus, Micro Channel Architecture (MCA) bus and Enhanced ISA (EISA) bus. As system architectures evolve, other bus architectures and chip sets may be used but often generally follow this pattern. For example, companies such as Intel and AMD support the Intel Hub Architecture (IHA) and the Hypertransport architecture, respectively.

The computer 110 typically includes a variety of computer readable media. Computer readable media can be any available media that can be accessed by computer 110 and includes both volatile and nonvolatile media, removable and non-removable media. By way of example, and not limitation, computer readable media may comprise computer storage media and communication media. Computer storage media includes both volatile and nonvolatile, removable and non-removable media implemented in any method or technology for storage of information such as computer readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can accessed by computer 110. Communication media typically embodies computer readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of the any of the above should also be included within the scope of computer readable media.

The system memory 130 includes computer storage media in the form of volatile and/or nonvolatile memory such as read only memory (ROM) 131 and random access memory (RAM) 132. The system ROM 131 may contain permanent system data 143, such as identifying and manufacturing information. In some embodiments, a basic input/output system (BIOS) may also be stored in system ROM 131. RAM 132 typically contains data and/or program modules that are immediately accessible to and/or presently being operated on by processor 120. By way of example, and not limitation, FIG. 2 illustrates operating system 134, application programs 135, other program modules 136, and program data 137.

The I/O interface 122 may couple the system bus 123 with a number of other busses 126, 127 and 128 that couple a variety of internal and external devices to the computer 110. A serial peripheral interface (SPI) bus 126 may connect to a basic input/output system (BIOS) memory 133 containing the basic routines that help to transfer information between elements within computer 110, such as during start-up.

In some embodiments, a security module 129 may be incorporated to manage metering, billing, and enforcement of policies. The security module is discussed more below, especially with respect to FIG. 5.

A super input/output chip 160 may be used to connect to a number of 'legacy' peripherals, such as floppy disk 152, keyboard/mouse 162, and printer 196, as examples. The super I/O chip 160 may be connected to the I/O interface 122 with a low pin count (LPC) bus, in some embodiments. The super I/O chip 160 is widely available in the commercial marketplace.

In one embodiment, bus 128 may be a Peripheral Component Interconnect (PCI) bus, or a variation thereof, may be used to connect higher speed peripherals to the I/O interface 122. A PCI bus may also be known as a Mezzanine bus. Variations of the PCI bus include the Peripheral Component Interconnect-Express (PCI-E) and the Peripheral Component Interconnect—Extended (PCI-X) busses, the former having a serial interface and the latter being a backward compatible parallel interface. In other embodiments, bus 128 may be an advanced technology attachment (ATA) bus, in the form of a serial ATA bus (SATA) or parallel ATA (PATA).

The computer 110 may also include other removable/non-removable, volatile/nonvolatile computer storage media. By way of example only, FIG. 2 illustrates a hard disk drive 140 that reads from or writes to non-removable, nonvolatile magnetic media. Removable media, such as a universal serial bus (USB) memory 152 or CD/DVD drive 156 may be connected to the PCI bus 128 directly or through an interface 150. Other removable/non-removable, volatile/nonvolatile computer storage media that can be used in the exemplary operating environment include, but are not limited to, magnetic tape cassettes, flash memory cards, digital versatile disks, digital video tape, solid state RAM, solid state ROM, and the like.

The drives and their associated computer storage media discussed above and illustrated in FIG. 2, provide storage of computer readable instructions, data structures, program modules and other data for the computer 110. In FIG. 2, for example, hard disk drive 140 is illustrated as storing operating system 144, application programs 145, other program modules 146, and program data 147. Note that these components can either be the same as or different from operating system 134, application programs 135, other program modules 136, and program data 137. Operating system 144, application programs 145, other program modules 146, and program data 147 are given different numbers here to illustrate that, at a minimum, they are different copies. A user may enter commands and information into the computer 20 through input devices such as a mouse/keyboard 162 or other input device combination. Other input devices (not shown) may include a microphone, joystick, game pad, satellite dish, scanner, or the like. These and other input devices are often connected to the processor 120 through one of the I/O interface busses, such as the SPI 126, the LPC 127, or the PCI 128, but other busses may be used. In some embodiments, other devices may be coupled to parallel ports, infrared interfaces, game ports, and the like (not depicted), via the super I/O chip 160.

The computer 110 may operate in a networked environment using logical connections to one or more remote computers, such as a remote computer 180 via a network interface controller (NIC) 170. The remote computer 180 may be a personal computer, a server, a router, a network PC, a peer device or other common network node, and typically includes many or all of the elements described above relative to the computer 110. The logical connection between the NIC 170 and the remote computer 180 depicted in FIG. 2 may include a local area network (LAN), a wide area network (WAN), or both, but may also include other networks. Such networking environments are commonplace in offices, enterprise-wide computer networks, intranets, and the Internet.

In some embodiments, the network interface may use a modem (not depicted) when a broadband connection is not available or is not used. It will be appreciated that the network connection shown is exemplary and other means of establishing a communications link between the computers may be used.

Figure 3:
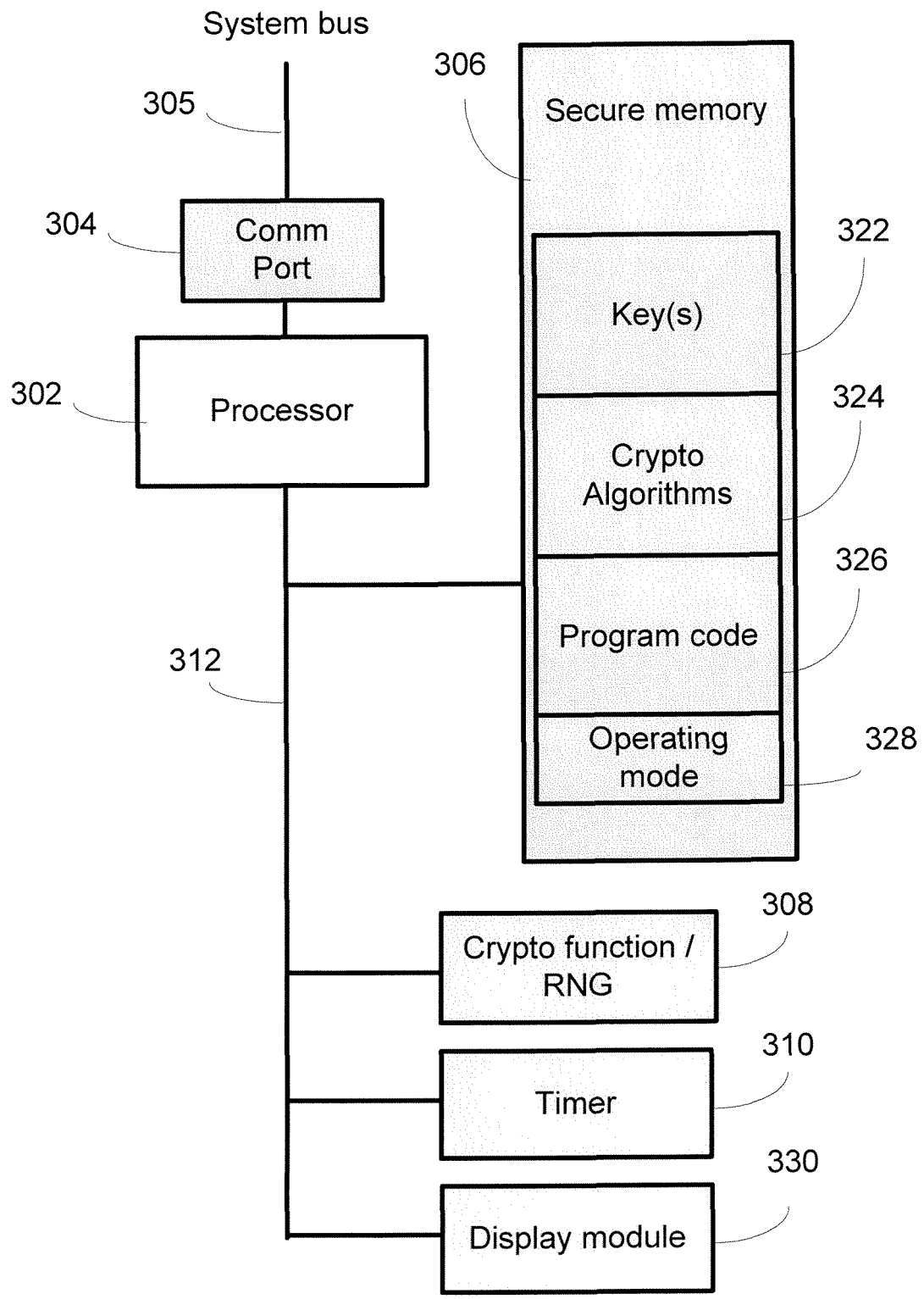
FIG. 3 is a block diagram of a representative security module.

FIG. 3 illustrates a security module 300, similar to security module 129 of FIG. 2. The processor 302 may use communication port 304 to send and receive commands via bus 305 with a system processor, such as processor 120 of FIG. 2 directly, or indirectly through an I/O interface, such as I/O interface 122 of FIG. 2. Communications from the security module 200 may also be with other peripherals such as graphics processor 190, or network interface 170, both of FIG. 2. In some embodiments, communication via the network interface 170 may be held directly with the core service 13 of FIG. 1, without support from the processor 120.

A memory 306 may be a secure memory and may store a number of data items and executable program modules. Because it is secure, the memory 306 may be used to store operating and recovery data with a much lower risk of tampering than would be the case in another system memory 130 or disk drive 140 of FIG. 2. A cryptographic function 308 may include a random number generator for use in authentication processes. A timer 310 may be used to determine metering time periods. The timer 310 may also be used for setting a required period for communication with the core service 13.

The memory 306 may include data and executable software modules for implementing the functions of the security module 300. As mentioned above, the conversion between software implementations and hardware-based logic are well known. Although the functions of the security module 300 are described as being implemented in software, implementation in software, firmware, logic or some combination is a design-time decision.

Cryptographic keys 322 may be used as part of a message authentication process, for example, to authenticate messages with the core service 13. The message authentication process may include hashing, encryption, or both and may incorporate either symmetric cryptography with message authentication codes or public key cryptography using encryption and digital signatures. If a dedicated cryptographic function 308 is not available or not used, cryptographic algorithms 324 may be used for message authentication or command verification. Program code 326 may include the stored executable instructions used by the processor 302 to implement message handling, pay-per-use operation when needed, and limited function mode operation when implicitly or explicitly required. The operating mode module 328 of the memory 306 may be used to store boot type between system resets or power cycles.

The secure memory 306 may also incorporate an alternate BIOS as part of the program code 326. Because, in the architecture of FIG. 2, the security module 300 is between the I/O interface 122 and the BIOS 133, the security module 300 may determine from which BIOS operations will be supported. When the program 326 is used, operation of the electronic device in which the security module 300 is incorporated may be substantially modified from normal operation following a conventional boot.

For example, memory mapped I/O devices may be disabled and graphics memory may be restricted as well as main program memory. When operating in a pre-boot environment, the security module 300 may act in the place of the main processor (e.g. processor 120 of FIG. 1) using direct access and control of various peripheral devices, such as the graphics processor 190 and network interface 170. For example, a display module 330 may be used to directly manage images displayed via the graphics processor 190 without intermediate support from the processor 120. In one embodiment, the image may direct an observer to contact a telephone number regarding returning the electronic device to its rightful owner.

Figure 4:
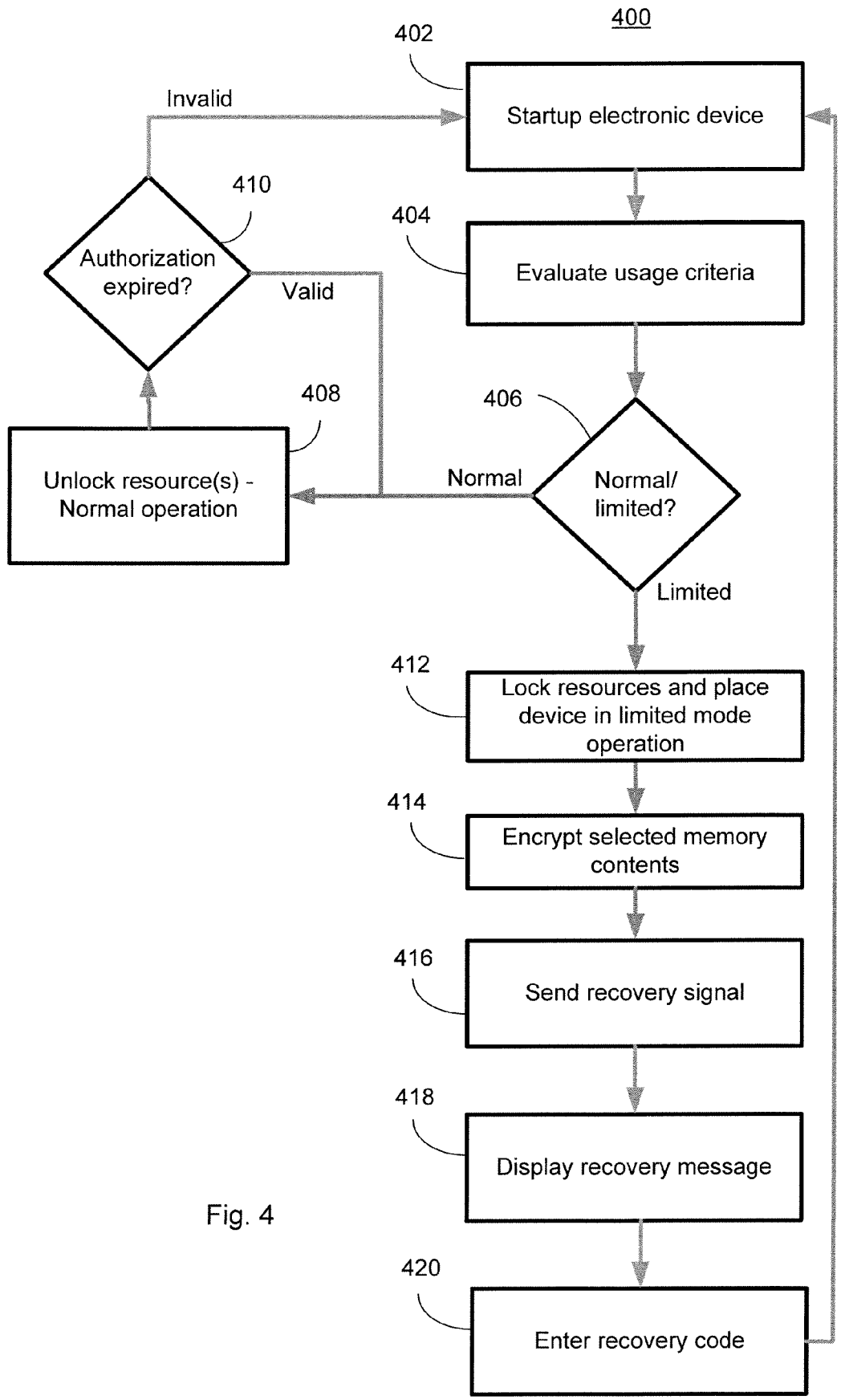
FIG. 4 is a flow chart representing a method of protecting an electronic device using a hardware theft deterrence.

FIG. 4 is a flow chart representing a method of protecting an electronic device using a hardware theft deterrence. At block 402, an electronic device, such as electronic device 11 of FIG. 1, may startup either through a power-on cycle or a warm start reset. At block 404, one or more of several usage criteria may be evaluated to determine the operating mode of the electronic device 11. The usage criteria may include evaluating a usage authorization to determine when usage is authorized. For example, the usage authorization may be a credential or token, including a login/password combination, a physical token such as a smart card or number generator that presents an expected value, or securely stored data from a previous login. In the latter case, a short life certificate or other dated and authenticated data may be examined to see if the data is still valid. During session initiation, e.g. login or startup, the data or short life certificate may be evaluated to see if it is still valid. If all of the available usage criteria are favorable, i.e. valid and unexpired, the 'normal' branch from block 406 may be taken to block 408.

At block 408, any locked resources may be unlocked and normal operation may continue. For example, BIOS memory 133 may be made available for booting. In another embodiment, system files may be decrypted and made available for booting or operation after a successful login. At block 410, the credential, especially a token with an expiration date or time, may be verified. If the credential is valid, normal operation may continue at block 408 by following the 'valid' branch from block 410. If, at block 410, the credential expires prior to receipt of an updated credential or is otherwise unverifiable, the 'invalid' branch may be followed from block 410 to block 402 and the electronic device 11 may be forced into a reset after setting a flag in the security module 12 indicating that subsequent start ups require updated validation.

If, at block 406, one of the usage criteria is found incorrect or invalid, the 'limited' branch from block 406 may be followed. One or more of blocks 412, 414, 416, and 418 may be executed and do not necessarily need to be in any particular order. Blocks 412-418 are representative and do not represent all possible options for limiting use of the electronic device 11 or securing sensitive data thereon. At block 412, some essential resources may be locked or disabled that will cause the electronic device 11 to operate in a limited function mode. For example, settings for the display controller may be locked that limits the display to a 640×480 display resolution. In another example, system memory may be limited to 4 Mbytes which allows a small monitor program to operate but not a full operating system. In another embodiment, resources may be locked in response to an explicit lock message received from a trusted source, such as a provisioning service.

At block 414, selected memory contents may be encrypted using keys stored in the security module 12. The memory contents may be disk drive content in selected folders, at designated locations, designated file names, or a combination. The encryption may occur during an extended boot process or a pseudo-boot process that will delay an operator from suspecting anything other than a normal boot is occurring. If the encryption occurs as a result of an explicit message, such as an encrypt message, the encryption process may run in the background while current foreground processes are allowed to operate normally. When the encryption process completes, the foreground processes may be terminated and the limited function mode entered directly or following a forced reset. In one embodiment, whenever memory designated as having sensitive information, such as personnel information, is requested for access, the security credentials may be confirmed. In extremely sensitive cases, online verification, user verification, or both may be required. Should such authentication fail, the contents may be encrypted immediately. When a higher level of threat is detected, such as tampering with the security module 12, the selected memory contents may be erased rather than encrypted.

At block 416, the electronic device 11, or more specifically, the security module 12 may cause a recovery signal to be sent to a home web site or similar service, when a connection to the Internet is available. The recovery signal may include whatever IP address information may be attached to the recovery signal for use by authorities to locate the electronic device 11.

At block 418, a recovery message may be displayed. The security module 12 may cause the message to be displayed even if a limited graphics mode is in use. The recovery message may include an explanation of why the electronic device 11 is not operating normally and may include contact information for how to restore operation. A reward may be offered, although such an offer may be retracted if theft is suspected.

At block 420, when the electronic device 11 is returned to a rightful owner/operator, a recovery code or token may be presented to the electronic device 11 or security module 12 that will clear any limited operation flags and allow the electronic device 11 to boot into a normal mode.

The ability to use a security module, such as security module 12, to provide a tamper-resistant level of protection that is unavailable when using software-only or stealth-based security measures. An electronic device using a security module for theft protection may allow prominent display of a message that indicates the electronic device is protected by such services. Such a deterrent offers an obvious benefit to users and system owners alike with added deterrence and recovery capabilities. Beyond deterrence, the ability to secure memory contents either when validation of credentials fails or in response to an explicit message offers protection against data theft and misuse. In this way, both the value of the electronic device and the potentially much greater value of the data are protected, to the benefit of all interested parties.

Although the foregoing text sets forth a detailed description of numerous different embodiments of the invention, it should be understood that the scope of the invention is defined by the words of the claims set forth at the end of this patent. The detailed description is to be construed as exemplary only and does not describe every possibly embodiment of the invention because describing every possible embodiment would be impractical, if not impossible. Numerous alternative embodiments could be implemented, using either current technology or technology developed after the filing date of this patent, which would still fall within the scope of the claims defining the invention.

Thus, many modifications and variations may be made in the techniques and structures described and illustrated herein without departing from the spirit and scope of the present invention. Accordingly, it should be understood that the methods and apparatus described herein are illustrative only and are not limiting upon the scope of the invention.

We claim:

1. A computing system adapted for theft deterrence and data protection comprising:
   a network interface enabling communication with a network service; and
   a security module coupled to the network interface and a memory, comprising:
      a secure memory storing first cryptographic keys used to encrypt selected contents of the memory and second cryptographic keys used to decrypt a watchdog message received via the network interface;
      a timeout timer that is reset responsive to timely receipt of the watchdog message;
      a mode module that places the computing system in a limited function mode providing the computing system network access only to a recovery service; and
      a cryptographic unit that uses the first cryptographic keys to encrypt contents on the memory in response to the computing system being placed in the limited function mode,
   wherein the security module is responsive to expiration of the timeout timer to cause the mode module to place the computing system in the limited function mode.

2. The computing system of claim 1, wherein the security module further comprises a display module that displays a recovery-oriented message on a display when in the limited function mode.

3. A method of protecting an electronic device comprising:
   evaluating a usage criteria to determine a usage mode;
   unlocking a resource enabling operation of the electronic device when the determined usage mode is normal;
   placing the electronic device in a limited operating mode when the determined usage mode is limited, the placing being achieved via a security module that includes:
      a secure memory storing first cryptographic keys used to encrypt selected contents of the memory and second cryptographic keys used to decrypt a watchdog message received via a network interface; and
      a timeout timer that is reset responsive to timely receipt of the watchdog message by the security module; and
      a cryptographic unit that uses the first cryptographic keys to encrypt contents on the memory responsive to the computing system being placed in the limited function mode;
   encrypting, using the cryptographic keys, only selected contents of a memory after the placing the electronic device in a limited operating mode; and
   allowing only recovery-related network traffic when the electronic device is in the limited operating mode.

4. The method of claim 3, further comprising sending a message to a pre-determined network location when in the usage mode is limited.

5. The method of claim 3, further comprising displaying a theft-oriented message when in the usage mode is limited.

6. The method of claim 3, wherein evaluating the usage criteria comprises determining when a valid credential is presented during session initiation.

7. The method of claim 6, wherein the valid credential is a successful user login process.

8. The method of claim 6, wherein the valid credential is a token indicating connection to an authorized network.

9. The method of claim 3, wherein evaluating the usage criteria comprises determining if a usage current credential has expired.

10. The method of claim 3, wherein the resource enabling operation of the electronic device is a memory device.

11. The method of claim 3, further comprising locking a resource responsive to a lock message.

12. The method of claim 3, further comprising erasing selected contents of the memory responsive to an erase message.

13. The method of claim 3, further comprising, erasing selected contents of the memory when the usage criteria is invalid.

14. A system for protection of an asset associated with an electronic device comprising:
- a security module in the electronic device having at least a secure memory storing cryptographic keys used to encrypt selected contents of the memory, the security module including:
  - a watchdog timer that expires unless reset by a cryptographically secure message and that, following expiration, will cause the security module to encrypt only selected data and place the electronic device in a limited function mode;
  - a cryptographic unit that uses the cryptographic keys to encrypt contents on the memory in response to the computing system being placed in the limited function mode,
- the security module being responsive to expiration of the watchdog timer to cause a mode module to place the computing system in the limited function mode;
- a provisioning service that generates the cryptographically secure message for the security module;
- a core service that distributes the cryptographically secure message to the electronic device; and
- a reporting service that maintains information regarding a state of the electronic device and sends a message to the provisioning service responsive to receipt of an authenticated deactivation request, wherein a signal for disabling the electronic device is sent to the security module.

15. The system of claim 14, further comprising a certificate authority that generates certificates use by the security module and the provisioning service.

16. The system of claim 14, wherein the reporting service is a web service accessible by a user for reporting a lost or stolen asset.

17. The system of claim 14, wherein the security module encrypts the selected data during an extended boot operation so as to delay user detection of the encryption.

18. The system of claim 14, wherein the security module encrypts the selected data during a pseudo-boot process so as to delay user detection of the encryption.

19. The computing system of claim 1, wherein the watchdog message received via the network interface is part of a provisioning packet including a digital certificate prepared by a certificate authority.

20. The system of claim 14, wherein the authorization message comprises a digital certificate.

\* \* \* \* \*